UNITED STATES PATENT OFFICE.

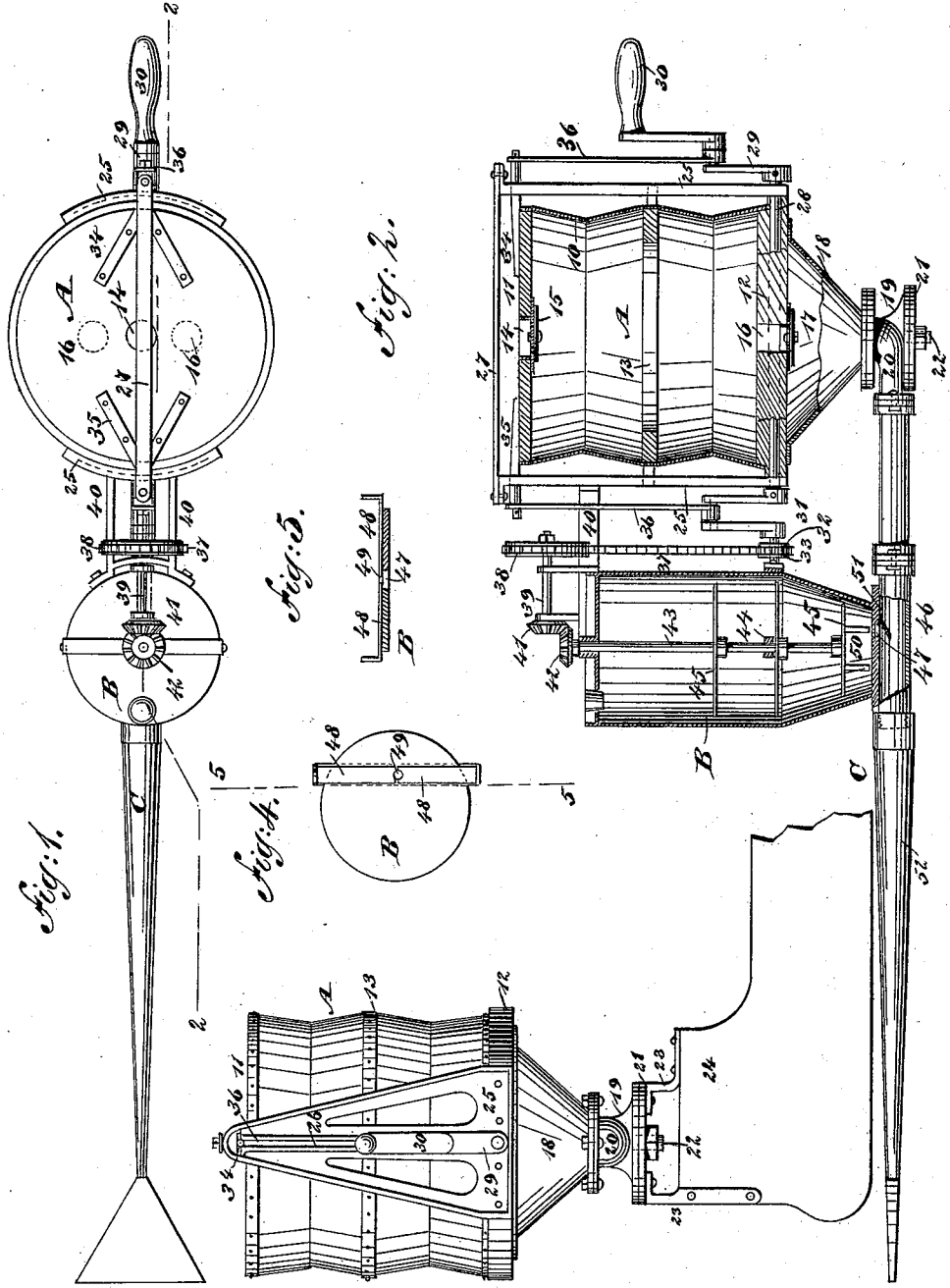

CHARLES H. PICKERING, OF HOUSTON, TEXAS, ASSIGNOR OF ONE-HALF TO JOHN H. B. HOUSE, OF SAME PLACE.

POISON-DISTRIBUTER.

SPECIFICATION forming part of Letters Patent No. 471,892, dated March 29, 1892.

Application filed November 28, 1891. Serial No. 413,386. (No model.)

*To all whom it may concern:*

Be it known that I, CHARLES H. PICKERING, of Houston, in the county of Harris and State of Texas, have invented a new and Improved Poison-Distributer, of which the following is a full, clear, and exact description.

My invention relates to an improvement in poison-distributers, and has for its object to produce a simple, durable, and economic implement capable of being attached to a saddle and of being operated by the rider at either side of the animal carrying the saddle to distribute poison on cotton and other plants for the purpose of destroying insects and worms.

A further object of the invention is to so construct the implement that it may be conveniently and expeditiously attached to a saddle and the driving-shaft turned in either direction to operate the gearing of the forcing mechanism.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the implement. Fig. 2 is a longitudinal section taken practically on the line 2 2 of Fig. 1. Fig. 3 is an end view of the implement, illustrating the manner in which it is attached to the saddle; and Figs. 4 and 5 are detail views of the drop-slides, illustrating the manner in which they operate in the bottom of the receptacle containing the poison, Fig. 5 being a section taken upon the line 5 5 of Fig. 4.

The implement consists, primarily, of a bellows A, a receptacle B to contain the material to be distributed, and a spout C, through which the material is projected. The bellows comprises a body 10, circular and made of leather or other approved material, secured at its upper end to a disk 11 and at its lower end to a similar disk 12, being provided at its center with a hoop 13 or the equivalent thereof. The upper disk 11 is provided with a circular opening 14, normally closed by a valve 15, connected with the under face of the disk. The lower disk 12 is provided with two openings 16, one located at each side of the center, as shown in dotted lines in Fig. 1, and these openings are closed by valves 17, connected with the under face of the disk. The lower face of the disk has also attached thereto a conical casing or hopper 18, which hopper has a flange-section 19 secured to its lower end, which section contains an outwardly-extending pipe 20, the pipe having direct communication with the interior of the hopper. The flange-section 19 is connected with a disk 21 through the medium of a pivot-bolt 22, and the disk 21 is adapted to have attached to its under face three or more brackets or legs 23, which are intended to be secured in any suitable or approved manner to the pommel 24 of a saddle, as shown in Fig. 3. By this means the bellows and parts connected therewith may be turned in any direction that the operator may desire.

From each side of the lower disk 12 standards 25 are projected upward, each of the standards being provided with a vertical slot 26. The standards are of greater height than that of the bellows when fully extended, and are connected at their upper ends by a cross-bar 27.

A shaft 28 is journaled in the lower disk or head 12 of the bellows, the said shaft passing between the valved openings 16. A crank-arm is located at the outer end of the shaft, and the said crank-arm 29 has connected therewith a handle 30, through the medium of which the shaft is revolved. The inner end of the shaft is journaled in a socket formed upon the outer face of the hopper B, which is located adjacent to the bellows, and between the bellows and the hopper a crank-arm 31 is formed in the shaft 28, while near said crank-arm a sprocket-wheel 32 is keyed or otherwise secured to the shaft.

Upon the top of the bellows two arms 34 and 35 are secured. These arms extend outward through the slots 26 in the standards 25, one arm being connected with the crank 29 of the shaft 28 by a link 36, the other arm having a like connection with the crank-arm 31 of the shaft, as is best shown in Fig. 2. Thus when the shaft is revolved the bellows by said revolution is expanded and contracted.

The sprocket-wheel 32 is connected by a chain belt 37 with a larger sprocket-wheel 38, fast upon a shorter horizontal shaft 39, journaled upon the top of the hopper and upon suitable bearings attached to a horizontal frame 40, connecting the hopper with the contiguous standard of the bellows. The shaft 39 carries at its inner end a beveled gear 41, which meshes with a similar gear 42, fast upon an upright shaft 43, which shaft extends downward into the hopper and revolves therein, the shaft being steadied near its lower end by a cross-bar 44 or the equivalent thereof. This shaft carries a number of beater arms or blades 45, adapted to keep the material in the hopper in constant agitation while the machine is in operation. The bottom of the hopper is attached to a pipe 46, which pipe is connected in any approved manner with the pipe 20, having communication with the bellows. Direct communication is established between the pipe 46 and the bottom of the hopper B through the medium of an opening 47, and through this opening the material is fed from the hopper to the pipe, and the amount of material to be delivered to the latter is controlled by slides 48, fitted in suitable channels in the bottom of the hopper and extending over the opening at their inner ends and beyond the outer faces of the hopper at their outer ends. The inner ends of the slides may be brought in contact with each other. Each slide at its inner end is provided with a semicircular recess 49, as shown in Fig. 4, and when the slides are in engagement the smallest amount of material is permitted to pass to the pipes; but the slides may be carried outward so as to expose the entire opening 47.

The lower end of the hopper is contracted, and the lower beater-arm has pendent therefrom a series of spindles or teeth 50, which are intended to convey the material in the hopper to the opening 47. In order to prevent the air forced from the bellows into the pipe 46 and adapted to force the material from the pipe from passing upward into the hopper and interfering with the flow of material therefrom a guard or shield 51 is employed, which is attached to the under face of the bottom of the hopper at that side of the opening 47 adjacent to the bellows, the shield sustaining an angular position with respect to the vertical axis of the bellows, as is likewise shown in Fig. 2.

The pipe 46 has attached thereto a nozzle 52, the outer end of which nozzle is flattened, in order to properly spread the material ejected therefrom.

It is evident that when the shaft 28 is revolved the bellows will be raised and lowered and the material in the hopper will be kept in constant agitation and fed through the opening 47. When the material enters the pipe 46, it will receive the air-blast created by the bellows and the said material will be forced out through the nozzle 52.

By swiveling the device upon a saddle, it may be turned in any desired direction, so as to take advantage of the wind.

This implement is exceedingly simple, and as it can be attached to a saddle it may be operated where wheeled implements of like character cannot be used.

Having thus described my invention, I claim as new and desire to secure by Letters Patent—

1. In a poison-distributer, the combination, with a bellows, a pipe connected with the bellows, and a hopper connected with the pipe, of a crank-shaft journaled in the lower head of the bellows, arms attached to the upper head of the bellows, guides for said arms, and a link connection between the crank-shaft and the bellows-arms, as and for the purpose set forth.

2. In a poison-distributer, the combination, with a plate adapted for attachment to a saddle, a hopper provided with an outlet-tube having a swivel connection with the plate, and a bellows secured to the upper portion of the hopper, of a tube connected with the outlet of the hopper, a second hopper adapted to contain the material to be distributed and having connection with said tube, and a drive-shaft journaled above the hopper and connected with the upper portion of the bellows, as and for the purpose set forth.

3. In a poison-distributer, the combination, with a plate adapted for attachment to a saddle, a hopper having a swivel connection with the plate and provided with an outlet-tube, and a bellows the lower head of which is secured to the hopper, of a pipe connected with the outlet-tube of the hopper, a second hopper adapted to contain the material to be distributed, connected with the pipe and provided with a deflecting-shield at its connection therewith, agitators held to revolve in the hopper above the pipe, a drive-shaft, and a driving connection between the drive-shaft and the agitators and between said shaft and the bellows, substantially as and for the purpose specified.

CHARLES H. PICKERING.

Witnesses:
J. J. McKEEVER, Jr.,
W. M. BAUGH.